United States Patent [19]

Weaver

[11] Patent Number: 4,487,382
[45] Date of Patent: Dec. 11, 1984

[54] CASSETTE FOR STRAIN RECORDER

[75] Inventor: John H. Weaver, Carleton Place, Canada

[73] Assignee: Leigh Instruments Limited, Carleton Place, Canada

[21] Appl. No.: 414,820

[22] Filed: Sep. 3, 1982

[51] Int. Cl.³ .................. G03B 1/04; G11B 15/32; G01D 15/26
[52] U.S. Cl. .................. 242/197; 242/200; 346/136
[58] Field of Search .............. 242/67.4, 197–200, 242/67.3, 75.2; 40/471, 478, 483, 518–523; 346/7, 136, 145

[56] References Cited

U.S. PATENT DOCUMENTS

| | | | |
|---|---|---|---|
| 2,994,147 | 8/1961 | Bergier et al. | 40/518 |
| 3,034,241 | 5/1962 | Kossor et al. | 40/523 |
| 3,195,242 | 7/1965 | Ward et al. | 40/518 |
| 3,306,548 | 2/1967 | Polder | 242/67.3 |
| 3,365,142 | 1/1968 | Bakke et al. | 242/75.2 |
| 3,787,885 | 1/1974 | Johnson | 346/136 |
| 3,790,951 | 2/1974 | O'Neill et al. | 346/7 |
| 3,906,511 | 9/1975 | Kelemen | 346/7 |

FOREIGN PATENT DOCUMENTS 369615  9/1936  Canada .
635584  1/1962  Canada .
998660 10/1976  Canada .

Primary Examiner—Leonard D. Christian
Attorney, Agent, or Firm—Wenderoth, Lind & Ponack

[57] ABSTRACT

A cassette for a scratch strain recorder has a rotatable supply bobbin geared directly to a rotatable take-up bobbin so that rotation of the take-up bobbin will be equal in amount but opposite in direction to that of the supply bobbin. The recording tape is formed of a roll of flat resilient material which has one end attached to the supply bobbin and which, in the unused condition, is almost totally wound around the supply bobbin except for the other end which is attached to the take-up bobbin. The tape is driven by a capstan and pinch roller, the capstan being arranged for driving connection to a drive shaft of the strain recorder itself. Because of its inherent resilience the coil tries to straighten, i.e. unwind, and this assists rotation of the two bobbins when the capstan is operated and the direct gear interconnection causes an equalization of the spring forces between the two bobbins as the cassette progresses from an unused condition to a nearly completely used condition.

16 Claims, 5 Drawing Figures

CASSETTE FOR STRAIN RECORDER

BACKGROUND OF THE INVENTION

1. Field of the Invention

This invention relates to recording tape cassettes and particularly to cassettes for use with a scratch strain recorder of the type which has a drive shaft for advancing the tape and a stylus for scratching the tape when a body which is being monitored experiences strain.

2. Description of the Prior Art

U.S. Pat. No. 3,906,511 (Kelemen) which issued on Sept. 16, 1975 describes a scratch strain recorder of the type for which the cassette of the present invention is particularly suitable and the disclosure of that patent is hereby incorporated by reference.

Broadly the scratch strain recorder of the prior patent is arranged to be mounted to a body the strain of which is to be monitored. The recorder includes a rotatable drive shaft which rotates only when strain motion occurs and a stylus or needle which also moves when strain motion occurs. Although movement of the stylus can be in two opposite directions depending on the direction of the strain the drive shaft always rotates in the same direction regardless of the strain direction.

A cassette carrying a steel recording tape is mounted onto the recorder so that a capstan in the cassette is drivingly engaged by the recorder drive shaft. The cassette also has a pinch roller or back-up roller, the recording tape passing between the capstan and pinch roller on its way between a supply pin and a take-up pin. Both of these pins are non-rotatably mounted in the cassette and an opposite end of the tape is secured to each pin. The tape is wound as a spring coil, there being an equal number of turns of the coil wound around each pin. However, in an unused cassette the turns around the supply pin are very loosely wound while the turns around the take-up pin are tightly wound so that when the capstan rotates, on sensing by the recorder of strain motion, a small length of tape from the loosely wound coil around the supply pin is fed to the tightly wound coil around the take-up pin, thus making the supply coil tighter and the take-up coil looser. The recordable length of tape is effectively used up when the supply coil is pulled tightly around the supply pin.

The cassette disclosed in U.S. Pat. No. 3,906,511 operates satisfactorily in that it provides very low resistance to feeding of the tape by the capstan and thereby permits smooth and accurate feeding of the tape by the capstan even when the capstan is subjected to rapid intermittent rotation. A major problem with the prior cassette, however, is that because of the amount of tape required to be wound around the pins to enable take-up and supply of tape to function, the amount of tape available for recording is greatly reduced e.g. in a 60 inch length of tape approximately only 28 inches is available for recording.

Thus, it is a primary object of the present invention to provide a tape cassette for a scratch strain recorder which makes a much more efficient use of the tape while at the same time not compromising on accuracy and smoothness of operation.

Another object of the invention is to provide a subassembly containing the tape which may be removed when the tape is used up and replaced in the field.

It is a further object to provide a novel tape cassette, particularly but not exclusively, for a scratch strain recorder.

SUMMARY OF THE INVENTION

The present invention, according to one aspect is a cassette which has two rotatably mounted bobbins in a cavity of a housing. The bobbins are mechanically interconnected, for example by forming the bobbin flanges as spur gears which are meshed with each other. The bobbins and gears are identical so that clockwise movement of the supply bobbin causes counter clockwise movement by an equal amount of the take-up bobbin. A recording tape is attached securely at both its ends to the respective bobbins and, in unused condition, is almost completely wound onto the supply bobbin. The tape is arranged to wind around the take-up bobbin as it is wound off the supply bobbin.

The means for feeding the tape from the supply bobbin and the take-up bobbin is a capstan and pinch roller which elements may be provided as components of the cassette in which case the capstan projects externally of the housing for driving engagement by a drive shaft of the recorder. Alternatively, the capstan and pinch roller may be provided as part of the recorder rather than the cassette. In either case, an arrangement whereby, by means of a single drive shaft, recording tape can be wound off one bobbin and on to another has been provided and in which almost all of the tape is used for recording.

Smooth relatively friction free operation can be achieved by using appropriate bearings for mounting the bobbins. In one embodiment described the bobbins are held in a holder made of a low friction material and spindles of the bobbins are received in holes in the holder.

For use in a scratch strain recorder, the tape may be metal, for example stainless steel. The tape is formed as a resilient flat metal strip which can be wound into a coil against the inherent resilience of the tape. In the unused cassette, the tape is wound onto the supply bobbin in one angular direction and tape is fed to the take-up bobbin where it is wound in the other angular direction. The total amount of tape is wound onto the supply bobbin except for a small end portion which attached directly to the centre spindle of the take-up bobbin. As tape is fed from supply bobbin the stored energy in the wound up tape on the supply bobbin is released causing the tape to tend to unwind from the supply bobbin and causing rotation of the supply bobbin in the one angular direction. The take-up bobbin is, because of the geared interconnection, caused to rotate in the other direction to take-up slack in the tape.

As the tape comes off the supply bobbin its resilience causes the roll to expand as much as it can consistent with tape tension in the take-up roll and in this way the opposing forces from the rolls on the two bobbins become balanced with each roll being loosely wound on its bobbin.

BRIEF DESCRIPTION OF THE DRAWINGS

The novel features that are considered characteristic of the invention are set forth with particularity in the appended claims. The invention itself however, both as to its organization and its method of operation will best be understood from the following description of the preferred embodiment when read in connection with the accompanying drawings wherein like numbers have been employed in the different figures to denote the same parts and wherein:

DESCRIPTION OF THE PREFERRED EMBODIMENT

Figure 1:
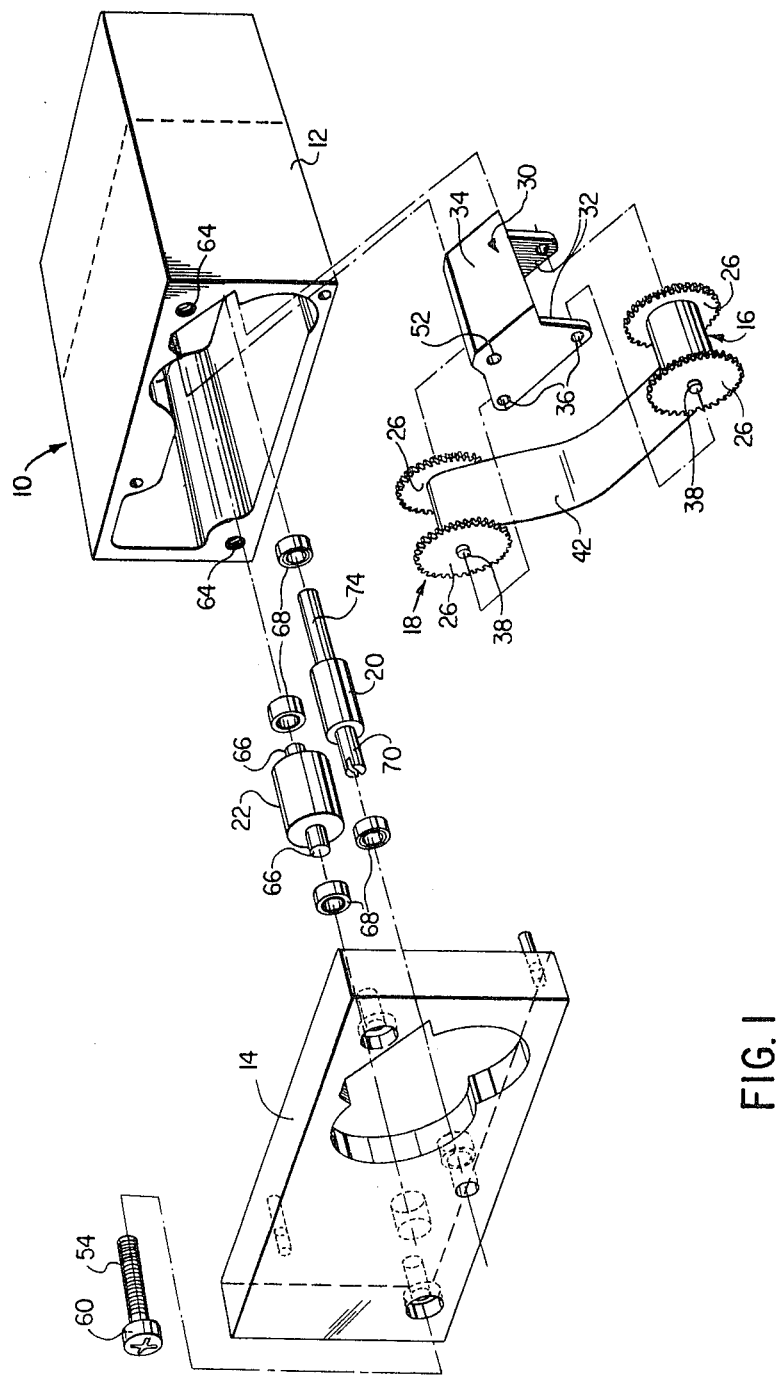
FIG. 1 is an exploded perspective view of a cassette according to the present invention.

The cassette assembly 10 includes a housing 12 and cover 14. The housing 12 has a cavity formed therein to accommodate a supply bobbin 16, a take-up bobbin 18, a capstan 20 and a pinch roller 22. Each bobbin 16 or 18 comprises a hub portion 24 (FIGS. 3 and 4) and two spaced circular flange portions 26, one located at each end of hub portion 24. The flange portions 26 are formed as spur gears having peripherally spaced teeth 28. The two bobbins 16 and 18 are mounted as a subassembly in a bobbin holder 30 such that the bobbins are aligned parallel to each other with the gear teeth 28 of the supply bobbin 16 engaged or meshed with the gear teeth 28 of the take-up bobbin 18 as seen clearly in FIGS. 2 and 4.

The bobbin holder is generally U-shaped in cross-section having two spaced flat plates 32 joined by a leg 34 (FIG. 1). Each plate 32 is provided with two holes 36 located adjacent opposite free edge corners of the plate, the holes 36 of one plate 32 being aligned, respectively, with the holes 36 of the other plate 32. As can be seen most clearly in FIGS. 2 and 3 the holes 36 receive and provide journals for projecting spindle portions 38 which project centrally from respective flange portions or gear wheels 26.

To reduce rotational friction the contact area between the flat ends of flange portions 26 and the bobbin holder 30 is kept to a minimum by forming the bobbin holder with four inwardly forcing curved projections 40 at the respective locations of holes 36. In other words each hole 36 extends through a respective projection 40 as can be seen most clearly in FIG. 3. As can also be seen from the same figure the projections 40 provide clearances between the flat ends of flange portions 26 and the bobbin holder 30. Assembly of the bobbins in the holder is permitted by the flexibility of the holder.

Figure 5:
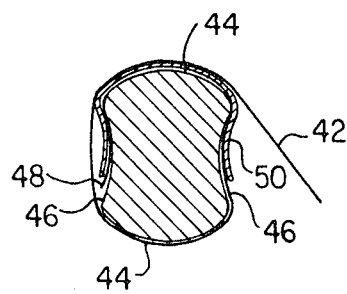
FIG. 5 is a further enlarged view of a detail of FIG. 4.

A stainless steel tape 42 has one end secured to the hub portion 26 of supply bobbin 16 and the other end secured to the hub portion 26 of take-up bobbin 18. Any convenient means for so securing the tape ends can be used. One such satisfactory technique is illustrated in FIG. 5. The hub portion 26 is seen to be configured in cross-section with two opposite convex surfaces 44 and two opposite concave surfaces 46. The free end portion 48 of tape 42 is secured to hub portion 26 by a spring clip 50. The clip 50 is generally U-shaped with a bight conforming to the shape of one of the convex surfaces 44 and two legs conforming to the shape of the concave surfaces 46. The spring clip 50 can be pushed on to the hub portion 26 to trap and secure free end portion 48 of the tape. An important feature of the present invention is that each end of tape 42 is wound in the same direction around the respective bobbin. In the example shown each end of the tape is wound clockwise on the respective bobbin. Another important feature is that the tape is treated so that, when wound onto a bobbin, it tends to straighten out under its inherent resilience to assume its straight condition.

Figure 2:
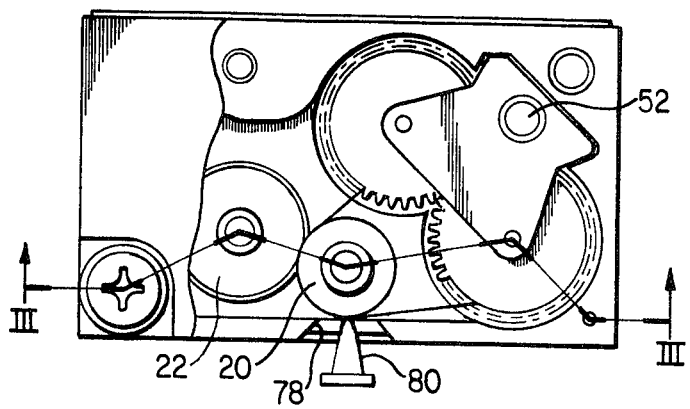
FIG. 2 is an end view, with parts broken away of the cassette of FIG. 1.

As shown in FIG. 2 the bobbin subassembly comprising bobbins 16 and 18, holder 30 and tape 42 is located in the cavity of housing 12 with the tape 42 relatively tightly wound on the full supply bobbin 16 and passing around the capstan 20, between the capstan and pinch roller 22 and on the empty take-up bobbin 18. The bobbin subassembly may be held in position by means of a screw 52 (FIG. 2) which extends through a tapped hole running through leg 34 of the bobbin holder in a direction parallel to the bobbin axes and also through a hole in the bottom of the housing 12. Although this screw and its interraction with the aligned holes is not shown in detail it would be similar to screw 54 shown in FIG. 3. This screw is seen to be threadably engaged in a tapped hole 56 in the top of housing 12 and to register with a hole 58 in the cover 14. The screw head 60 engages a recess 62 to retain the cover 14 on housing 12. Locating pins 64 also assist in locating cover 14 on housing 12.

Figure 3:
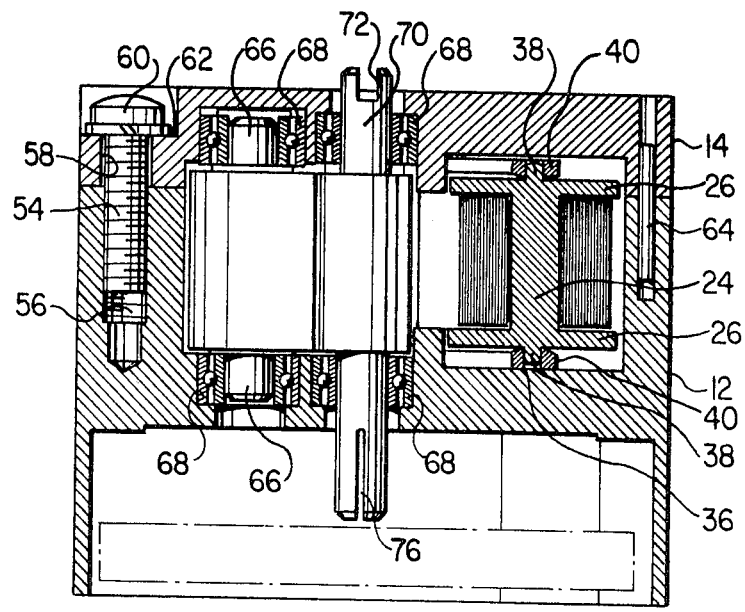
FIG. 3 is a sectional view on line III—III of FIG. 2 and drawn to a slightly enlarged scale.
Figure 4:
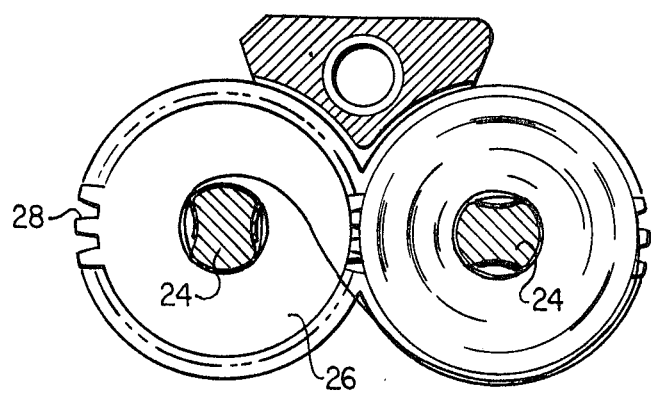
FIG. 4 is an enlarged view showing details of the bobbins of the cassette.

Pinch roller 22 has two spindles 66 rotatably received in respective bearings 68 one of which, as can be seen in FIG. 3, is retained in a recess in the housing and the other of which is retained in a recess in the cover. In a similar fashion capstan 20 is rotatably supported in bearings 68 but in this case the capstan spindles are longer so as to project respectively from the top surface of the cover 14 and the underside of housing 12. Upper capstan spindle 70 is formed with a screw-driver slot 72 to permit manual advancement of the tape, if desired. Lower capstan spindle 74 is made radially resilient by providing it with two elongate slots 76 which intersect at right angles to each other. This is to permit capstan spindle 76 to be received in an axial hole of a drive shaft forming part of a strain recorder.

As can be seen in FIGS. 1 and 2 the cassette housing 12 has an opening 78 therethrough. Opening 78 extends parallel to the rotational axis of capstan 20 and is disposed immediately adjacent capstan 20 to permit access to the tape 42 of a recording stylus and a reference stylus forming part of the strain recorder. The recording stylus 80 is shown in FIG. 2 in diagrammatic form.

In use, with the cassette 10 mounted to a strain recorder such as that of above referenced U.S. Pat. No. 3,906,511, any strain on the member being monitored will cause the drive shaft of the recorder to be rotated and at the same time the recording stylus 80 to move axially on the shaft in one direction or the other depending on the direction of the strain. The direction of rotation of the drive shaft is the same for both types of strain. Thus, the capstan 20 is intermittently rotated in a clockwise direction as seen in FIG. 2 to feed the tape off the supply bobbin 16, past the stylus 20 to record the strain and on to the take-up bobbin to store the recorded tape.

Because of the flat spring characteristic of the tape tending to uncoil the tape wound on supply bobbin 16 and the tape on to take-up bobbin 18, bobbin 16 experiences a tendency to rotate clockwise even when the capstan 20 is not being rotated. It does not actually rotate, however, because of its gearing with take-up bobbin 18 which is restrained from rotating counterclockwise by virtue of the friction of the tape 42 passing round capstan 20 and between the capstan and roller 22. As soon as capstan 20 is rotated in response to a strain movement being sensed the tendency for supply bobbin 16 to rotate clockwise is realised and this bobbin rotates essentially unaided by the capstan. Thus the capstan is only required to pull the tape off the loosely wound supply bobbin and simply feed a small length of tape past the stylus. The geared interconnection between the bobbins causes counter-clockwise rotation of take-up bobbin 18 and storage of the tape on that bobbin. As tape is unwound from bobbin 16 onto bobbin 18 the force exerted directly by the spring tape to tend to rotate bobbin 16 clockwise balances the force exerted directly by the spring tape to tend to rotate bobbin 18 counter-clockwise. The gearing between the bobbins causes an equalization of the net force tending to rotate the bobbins.

The result is that throughout the entire length of the tape there is virtually no friction or inertia in the bobbins for the capstan to overcome so that rapid, intermittent capstan rotation is possible.

The embodiments of the invention in which an exclusive property or privilege is claimed are defined as follows:

1. A cassette for a recorder, comprising:
   a housing;
   a supply bobbin and a take-up bobbin rotatably mounted in said housing, said bobbins being mechanically interconnected for causing rotation of one bobbin a particular amount in one angular direction to produce rotation of the other bobbin the same amount in the other angular direction;
   a recording tape in the form of a flat strip of resilient material, the tape having its one end attached to and wound around the hub of the supply bobbin and the tape having its other end attached to and windable around the hub of the take-up bobbin as it unwinds from the supply bobbin, the direction in which the tape extends around the bobbins being for causing the angular direction in which the tape moves around the take-up bobbin in the take-up direction to be opposite to the angular direction in which the tape moves as it is unwound from the supply bobbin.

2. A cassette according to claim 1, wherein the mechanical interconnection is constituted by at least one spur gear on one bobbin and an identical spur gear on the other bobbin engaged with said one spur gear.

3. A cassette according to claim 1, wherein each bobbin has a hub on which said tape is wound and two spaced flanges one on each end of said hub, the flanges being in the form of spur gears and the spur gears of one bobbin engaging, respectively, the spur gears of the other bobbin.

4. A cassette according to claim 1, 2 or 3, wherein the material of the tape is stainless steel.

5. A cassette according to claim 3, further comprising a common holder member in which the supply bobbin and the take-up bobbin are rotatably mounted with their gears meshed.

6. A cassette according to claim 5, wherein the bobbin holder is provided with low friction bearing portions for rotatably receiving respective spindles of the bobbins.

7. A cassette according to any of claims 1, 2, 3, 4 or 5 and further including a capstan and pinch roller rotatably mounted in the housing and engaging between them the tape extending between the two spindles, the capstan having means for connection to a drive shaft thereby to drive the tape.

8. A cassette according to claim 4, further including a capstan and pinch roller rotatably mounted in the housing and engaging between them the tape extending between the spindles, the capstan having means for connection to a drive shaft thereby to drive the tape.

9. A bobbin subassembly comprising a supply bobbin and a take-up bobbin each of which has a hub and two spaced circular flanges, each flange being in the form of a spur gear, a bobbin holder in which the supply bobbin and the take-up bobbin are rotatably mounted with the gears of one meshed with respective gears of the other, a recording tape in the form of a resilient flat metal strip, the tape having its one end attached to and wound around the hub of the supply bobbin and the tape having its other end attached to and windable around the hub of the take-up bobbin as it winds off the supply bobbin, the tape being wound around the bobbins for being movable off the supply bobbin in one angular direction and movable onto the take-up bobbin in the other angular direction.

10. A cassette for a scratch strain recorder of the type which has a single drive shaft and at least one movable stylus, the cassette comprising a housing in which are rotatably mounted a subassembly consisting of a supply bobbin and a take-up bobbin, the bobbins being mechanically interconnected so that the bobbins will rotate the same amount but in opposite angular directions, a scratch recording tape made of a flat strip of resilient material, the tape being attached to its one end of the supply bobbin and being wound around the supply bobbin, the tape being attached at its other end to the take-up bobbin and windable around the take-up bobbin as it winds off the supply bobbin, the tape being wound around the bobbins for being movable off the supply bobbin in one angular direction and movable onto the take-up bobbin in the other angular direction, a capstan and pinch roller both rotatably mounted in the housing, the capstan and pinch roller being positioned with their peripheries in mutual engagement and with a portion of the tape between the two bobbins being wound partly around the capstan and passing between the capstan and pinch roller, the capstan having a portion engageable with the drive shaft of the recorder, the housing having an opening in the vicinity of the capstan to permit access of a movable stylus to the tape.

11. A cassette according to claim 10, wherein the mechanical interconnection is constituted by at least one spur gear on one bobbin and an identical spur gear on the other bobbin engaged with said one spur gear.

12. A cassette according to claim 10, wherein each bobbin has a hub on which said tape is wound and two spaced flanges one on each end of said hub, the flanges being in the form of spur gears and the spur gears of one bobbin engaging, respectively, the spur gears of the other bobbin.

13. A cassette according to claim 12, further comprising a common holder member in which the supply bobbin and the take-up bobbin are rotatably mounted with their gears meshed.

14. A cassette according to claim 13, wherein the bobbin holder is provided with low friction bearing portions for rotatably receiving respective spindles of the bobbins.

15. A cassette according to claim 14, wherein the capstan has spindles extending through opposite ends of the housing, one of the spindles being deformable radially and fittable in a tight fit in a hollow end of the recorder drive shaft, the other spindle having a slot to permit manual advancement of the tape.

16. A cassette according to any of claims 10 to 15 wherein the material of the tape is stainless steel.

* * * * *